US012783090B2

(12) United States Patent
Lee et al.

(10) Patent No.: US 12,783,090 B2
(45) Date of Patent: Nov. 3, 2026

(54) TOUCH DISPLAY DEVICE AND METHOD WITH SWITCH TO DISABLE CURRENT PATH TO LED DURING TOUCH PHASE

(71) Applicant: AUO Corporation, Hsinchu City (TW)

(72) Inventors: Chia-Chi Lee, Hsinchu City (TW); Zeng-De Chen, Hsinchu City (TW)

(73) Assignee: AUO CORPORATION, Hsinchu City (TW)

( * ) Notice: Subject to any disclaimer, the term of this patent is extended or adjusted under 35 U.S.C. 154(b) by 0 days.

(21) Appl. No.: 18/912,645

(22) Filed: Oct. 11, 2024

(65) Prior Publication Data

US 2025/0199643 A1 Jun. 19, 2025

(30) Foreign Application Priority Data

Dec. 18, 2023 (TW) ................................ 112149330

(51) Int. Cl.

| | |
|---|---|
| ***G06F 3/041*** | (2006.01) |
| ***G06F 3/044*** | (2006.01) |
| ***G09G 3/3233*** | (2016.01) |

(52) U.S. Cl.

CPC ........ *G06F 3/04184* (2019.05); *G06F 3/0412* (2013.01); *G06F 3/0446* (2019.05); *G06F 3/0448* (2019.05); *G09G 3/3233* (2013.01); *G09G 2320/0247* (2013.01)

(58) Field of Classification Search

CPC .. G06F 3/04184; G06F 3/0412; G06F 3/0446; G06F 3/0448; G09G 3/3233; G09G 2320/0247

See application file for complete search history.

(56) References Cited

U.S. PATENT DOCUMENTS

| | | | | |
|---|---|---|---|---|
| 2015/0234520 A1* | 8/2015 | Chen | G06F 3/04886 345/173 |
| 2018/0239488 A1 | 8/2018 | Lin et al. | |
| 2018/0247592 A1* | 8/2018 | Zhang | G09G 3/3258 |
| 2020/0348785 A1* | 11/2020 | Tang | H10K 59/40 |
| 2020/0394953 A1 | 12/2020 | Kim et al. | |
| 2022/0171487 A1 | 6/2022 | Lin et al. | |

(Continued)

FOREIGN PATENT DOCUMENTS

| | | |
|---|---|---|
| CN | 108346400 A | 7/2018 |
| CN | 108459755 A | 8/2018 |

(Continued)

*Primary Examiner* — Liliana Cerullo

(74) *Attorney, Agent, or Firm* — WPAT, PC

(57) ABSTRACT

A touch display device comprises a plurality of first electrodes and a plurality of pixel circuits. Each of the plurality of first electrodes provides a first signal. Each of the plurality of pixel circuits comprises a current path and a light emitting element. The current path is coupled to a corresponding one of the plurality of first electrodes. The light emitting element is set on the current path. The touch display device is configured to enable the current path in a display phase to let the current path provide a driving current, the driving current flows through the light emitting element and to the corresponding one of the plurality of first electrodes to light up the light emitting element. The touch display device is further configured to disable the current path in a touching phase to let the current path stop providing the driving current.

14 Claims, 12 Drawing Sheets

(56) References Cited

U.S. PATENT DOCUMENTS

| | | | | |
|---|---|---|---|---|
| 2022/0206652 | A1* | 6/2022 | Lee | G06F 3/0443 |
| 2023/0143393 | A1* | 5/2023 | Ha | G06F 3/04184<br>345/173 |

FOREIGN PATENT DOCUMENTS

| | | | |
|---|---|---|---|
| CN | 112102772 | A | 12/2020 |
| CN | 113241039 | A | 8/2021 |

* cited by examiner

TOUCH DISPLAY DEVICE AND METHOD WITH SWITCH TO DISABLE CURRENT PATH TO LED DURING TOUCH PHASE

CROSS-REFERENCE TO RELATED APPLICATION

This application claims priority to Taiwan Application Serial Number 112149330, filed Dec. 18, 2023, which is herein incorporated by reference in its entirety.

BACKGROUND

Field of Invention

This disclosure relates to touch display technology, and in particular to a touch display device and operating method thereof for preventing screen flickering.

Description of Related Art

Micro LED display has the advantages of low power consumption, high color saturation and high response speed, which make micro LED display regarded as one of the popular technologies for the next generation of mainstream display products. On the other hand, the operation of touch display device based on micro-light emitting diode can generally be divided into a display phase and a touch phase. During the touch phase, the touch display device can pause updating the display screen, such as remaining the previous frame or displaying a black screen, to reduce signal interference during the touch phase. However, during the touch phase, the touch display device may utilize a touch signal with oscillating waveform to detect touch events. The touch signal may interfere with the micro-light emitting diode pixel circuit and cause its brightness to change or emit light erroneously. Therefore, users may notice screen flickering.

SUMMARY

The present disclosure provides a touch display device, includes a plurality of power electrodes and a plurality of pixel circuits. The plurality of power electrodes, each configured to provide a first signal. Each of the pixel circuits includes a current path and a light emitting element. The current path is coupled to a corresponding one of the plurality of power electrodes. The light emitting element is set on the current path. The touch display device is configured to enable the current path during a display phase to let the current path provide a driving current, the driving current is transmitted to the corresponding one of the plurality of power electrodes through the light emitting element to light up the light emitting element. The touch display device is configured to disable the current path during a touch phase to let the current path stops providing the driving current.

The present disclosure provides an operating method for a touch display device, wherein the touch display device includes a plurality of power electrodes and a plurality of pixel circuits, wherein each of the pixel circuits includes a current path and a light emitting element, wherein the current path is coupled to a corresponding one of the plurality of power electrodes, and the light emitting element is set on the current path, wherein the operating method includes: providing a first signal by each of the plurality of power electrodes; enabling the current path during a display phase to let the current path provide a driving current, wherein the driving current is transmitted to the corresponding one of the plurality of power electrodes through the light emitting element to light up the light emitting element; and disabling the current path during a touch phase to let the current path stops providing the driving current.

According to the embodiments of the present disclosure, the problem that the light emitting elements in the touch display device may flicker due to signal interference during the touch phase can be avoided; at the same time, the first electrode and the touch electrode share the same electrode, so that the number of power supplies can be reduced to achieve the technical advantage of saving power consumption.

DETAILED DESCRIPTION

The embodiments are described in detail below with reference to the appended drawings to better understand the aspects of the present disclosure. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

The terms "coupled" or "connected" as used herein may mean that two or more elements are directly in physical or electrical contact, or are indirectly in physical or electrical contact with each other. It can also mean that two or more elements interact with each other.

Figure 1:
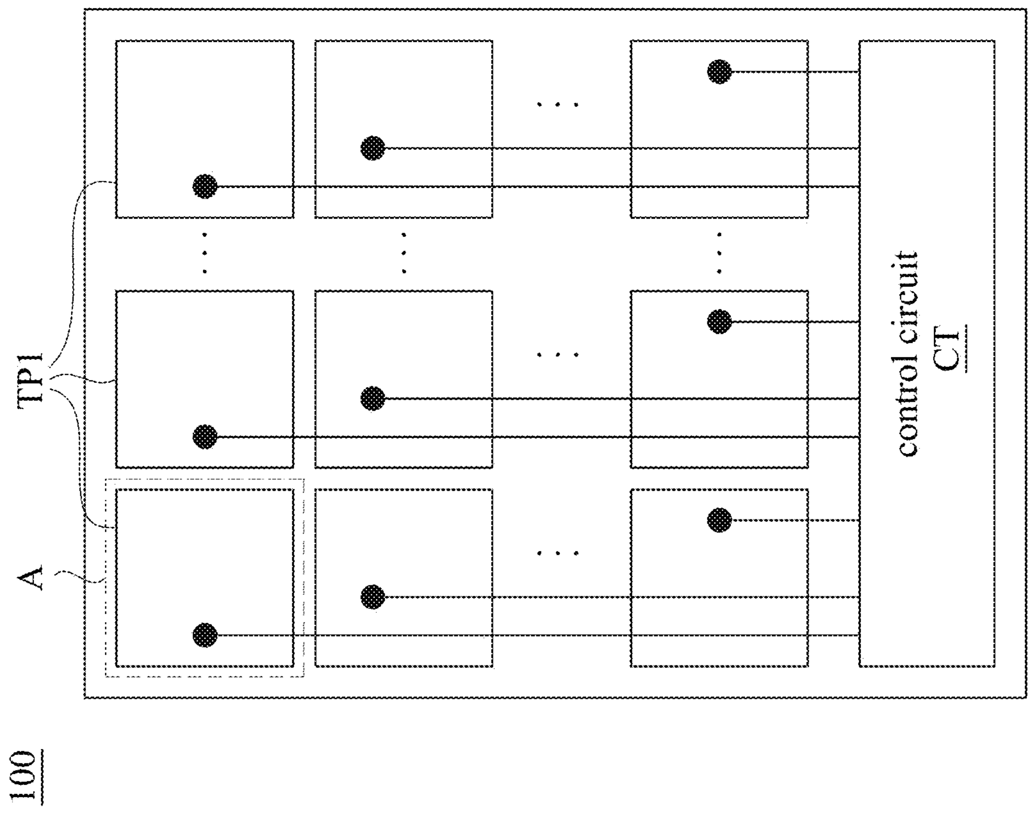
FIG. 1 is a schematic diagram of a touch display device according to an embodiment of the present disclosure.
Figure 2:
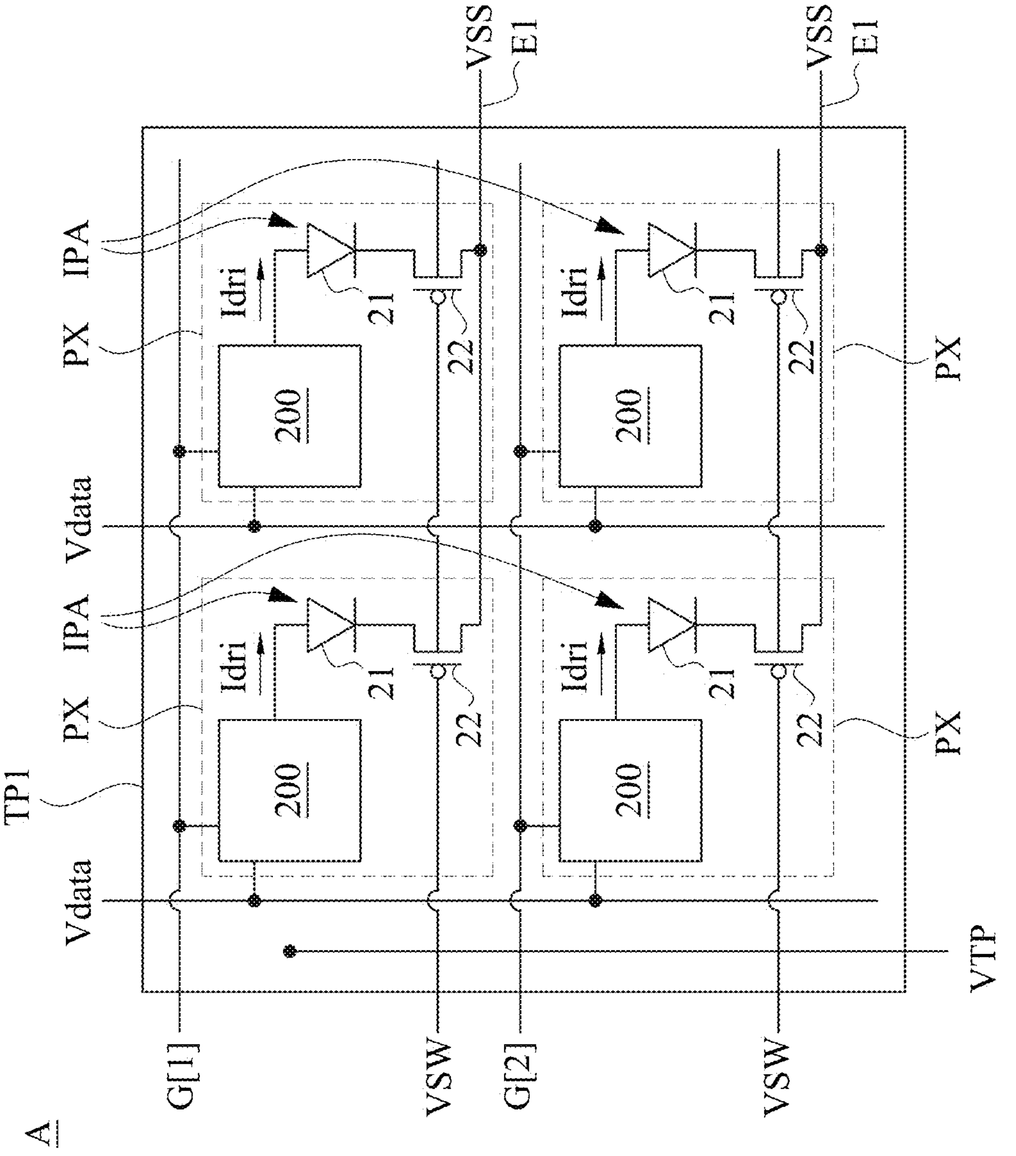
FIG. 2 is a schematic diagram of a pixel and touch electrode circuit according to an embodiment of the present disclosure.

Referring to FIG. 1 and FIG. 2 at the same time. FIG. 1 is a schematic diagram of a touch display device 100 according to an embodiment of the present disclosure. FIG. 2 is an enlarged schematic diagram of area A of the touch display device 100 according to an embodiment of the present disclosure. The touch display device 100 includes a plurality of pixel circuits PX, a control circuit CT, a plurality of power electrodes E1 and a plurality of first touch electrodes TP1. Each of the plurality of power electrodes E1 is configured to provide a first signal VSS, and different first touch electrodes TP1 are electrically insulated from each other. Each of the plurality of first touch electrodes TP1 receives a touch control signal VTP from the control circuit CT, therefore, each of the plurality of first touch electrodes TP1 can independently provide the touch control signal VTP to let each of the plurality of first touch electrodes TP1 independently detect whether touch events occurs at its location. A touch event is, for example, a specific object touching the touch display device 100 or a specific object approaching the touch display device 100. In some embodiments, the plurality of power electrodes E1 and the plurality of first touch electrodes TP1 are disposed on a same substrate, and the power electrodes E1 and the first touch electrodes TP1 can be implemented by using different metal layers.

The pixel circuit PX includes a driving circuit 200, a light emitting element 21, a current path IPA, and a switch 22. The driving circuit 200 is configured to determine the magnitude of the driving current Idri. The current path IPA is coupled between the driving circuit 200 and a corresponding power electrode E1. The light emitting element 21 is set on the current path IPA. More specifically, in this embodiment, the light emitting element 21 and the switch 22 are set on the current path IPA, and the light emitting element 21 and the switch 22 are connected in series between the driving circuit 200 and the power electrode E1. The touch display device 100 is configured to enable the current path IPA in a display phase (shown in FIG. 4) to let the current path IPA provide the driving current Idri to the light emitting element 21. The driving current Idri is transmitted to the power electrode E1 through the light emitting element 21 to light up the light emitting element 21. In this embodiment, "enabling the current path IPA" refers to conducting the switch 22, that is, the touch display device 100 is configured to conduct the switch 21 during the display phase to enable the current path IPA.

On the other hand, the touch display device 100 is configured to disable the current path IPA during a touch phase (shown in FIG. 4) to let the current path IPA stop providing the driving current Idri to the light emitting element 21. In this embodiment, "disabling the current path IPA" refers to turning off the switch 22, that is, the touch display device 100 is configured to turn off the switch 21 during the touch phase to disable the current path IPA.

Figure 3:
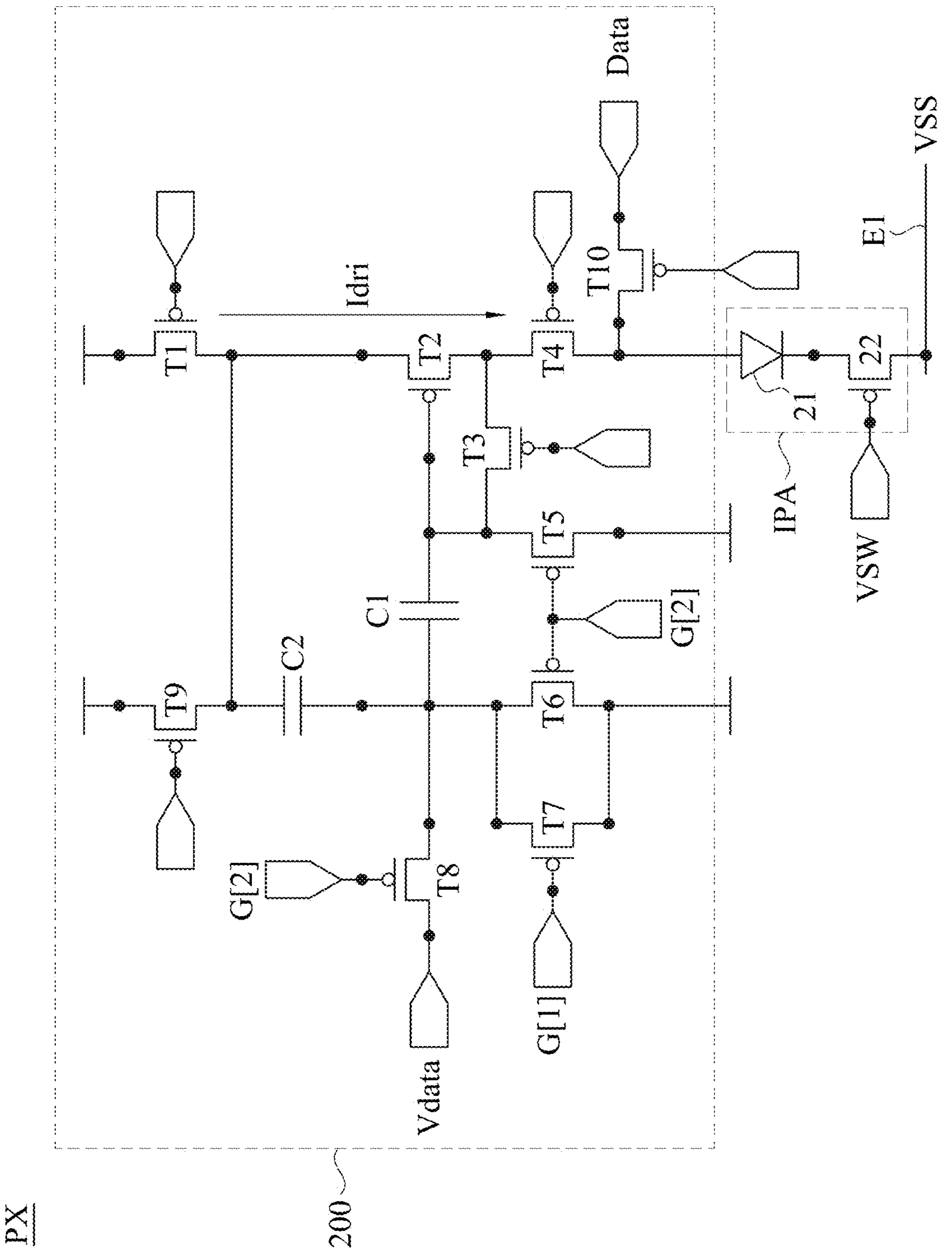
FIG. 3 is a schematic diagram of a pixel circuit according to an embodiment of the present disclosure.

Referring to FIG. 3, which FIG. 3 is a schematic diagram of a pixel circuit PX according to the first embodiment of the present disclosure. The pixel circuit PX includes a driving circuit 200, a light emitting element 21 and a switch 22. The driving circuit 200 includes transistors T1 to T10 and capacitors C1 to C2. The number of transistors and capacitors of the driving circuit 200 is not limited to the embodiment of FIG. 3, and the driving circuit 200 can be implemented with other suitable circuit structures.

In some embodiments, the light emitting element 21 is a micro light emitting diode (micro LED). In some embodiments, the touch display device 100 is a self-capacitive touch display device, and the plurality of first touch electrodes TP1 in the touch display device 100 are rectangular and arranged in an array, but the present disclosure is not limited to this.

The light emitting element 21 includes an anode terminal and a cathode terminal. The switch 22 includes a first terminal, a second terminal and a control terminal. The anode terminal of the light emitting element 21 is coupled to the driving circuit 200. The second terminal of the switch 22 is coupled to the power electrode E1 to receive the first signal VSS. The control terminal of the switch 22 is configured to receive the control signal VSW and be conducted. In some embodiments, switch 22 may be implemented as a P-type MOSFET. The pixel circuit PX is controlled by a plurality of control signals (for the sake of brevity, only the control signals G[1] and G[2] are shown), and generate the driving current Idri with a corresponding magnitude according to the data voltage Vdata.

Figure 4:
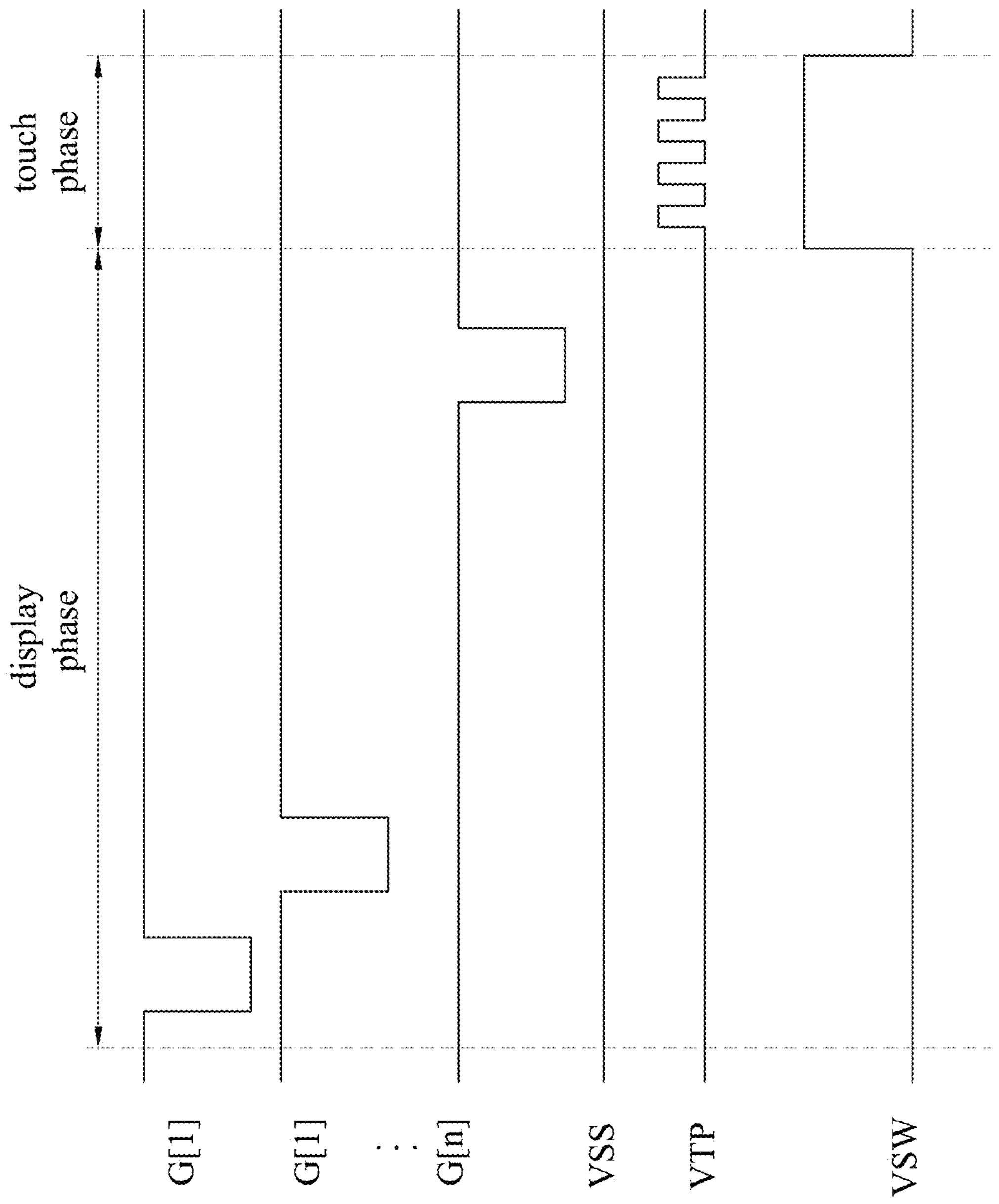
FIG. 4 is a waveform schematic diagram of a control signal of a pixel circuit according to an embodiment of the present disclosure.

Also referring to FIG. 4, which is a waveform schematic diagram of a control signal of the touch display device 100 according to the first embodiment of the present disclosure, and the control signal waveform in FIG. 4 is applicable to the embodiment of FIG. 2. The operation of the pixel circuit PX can be divided into the display phase and the touch phase. The pixel circuit PX in the first column is configured to receive control signals G[1] and G[2]; the pixel circuit PX in the second column is configured to receive control signals G[2] and G[3]; the pixel circuit PX in column n−1 is configured to receive control signals G[n−1] and G[n], and so on, wherein "n" is a positive integer. The light emitting control signals G[1]~G[n] are configured to provide pulse waves in sequence during the display phase to let the touch display device 100 update the displayed image. In the embodiment of FIG. 4, the first signal VSS remains at a first voltage level during both display phase and touch phase. The touch control signal VTP is configured to remain at a fixed voltage level during the display phase, and changes to a periodic signal during the touch phase to detect touch events. The switch control signal VSW is at a low voltage level during the display phase to conduct the switch 22 and thereby enable the current path IPA. The switch control signal VSW is at a high voltage level during the touch phase to turn off the switch 22 and thereby disable the current path IPA. In this way, even if the first signal VSS may vary due to the coupling interference of the touch control signal VTP, the light emitting element 21 may not emit or flicker erroneously during the touch phase because the switch 22 has already electrically insulated the light emitting element 21 from the power electrode E1.

Figure 5:
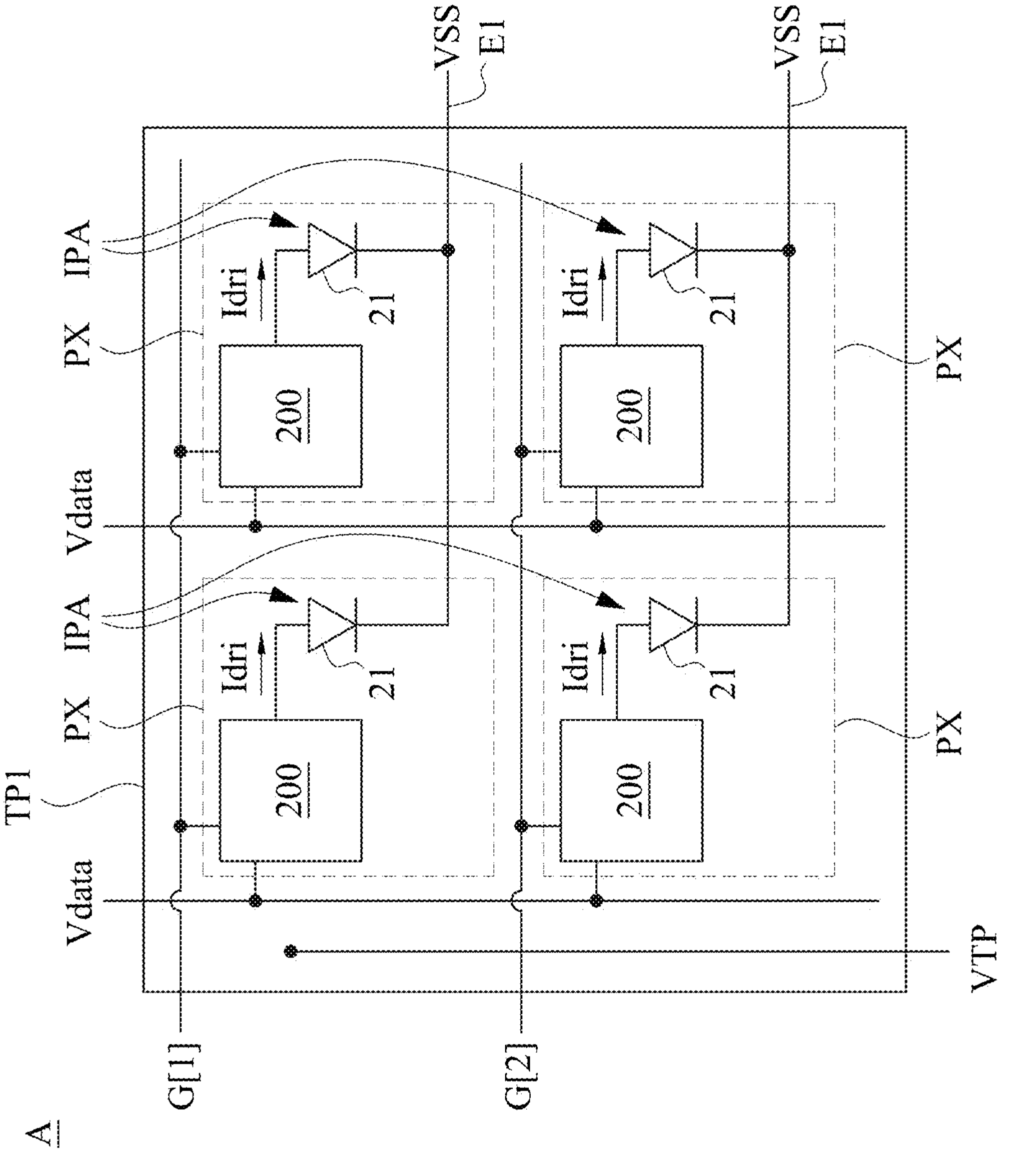
FIG. 5 is a schematic diagram of a pixel and touch electrode circuit according to an embodiment of the present disclosure.

Referring to FIG. 5, which is an enlarged schematic diagram of area A of the touch display device 100 according to an embodiment of the present disclosure. The difference between the embodiment of FIG. 5 and the embodiment of FIG. 2 is that the pixel circuit PX of the embodiment of FIG. 5 does not include the switch 22; the light emitting element 21 is directly coupled to the power electrode E1 to receive the first signal VSS. The rest of the embodiment of FIG. 5 is similar to the embodiment of FIG. 2 and will not be repeated here.

Figure 6:
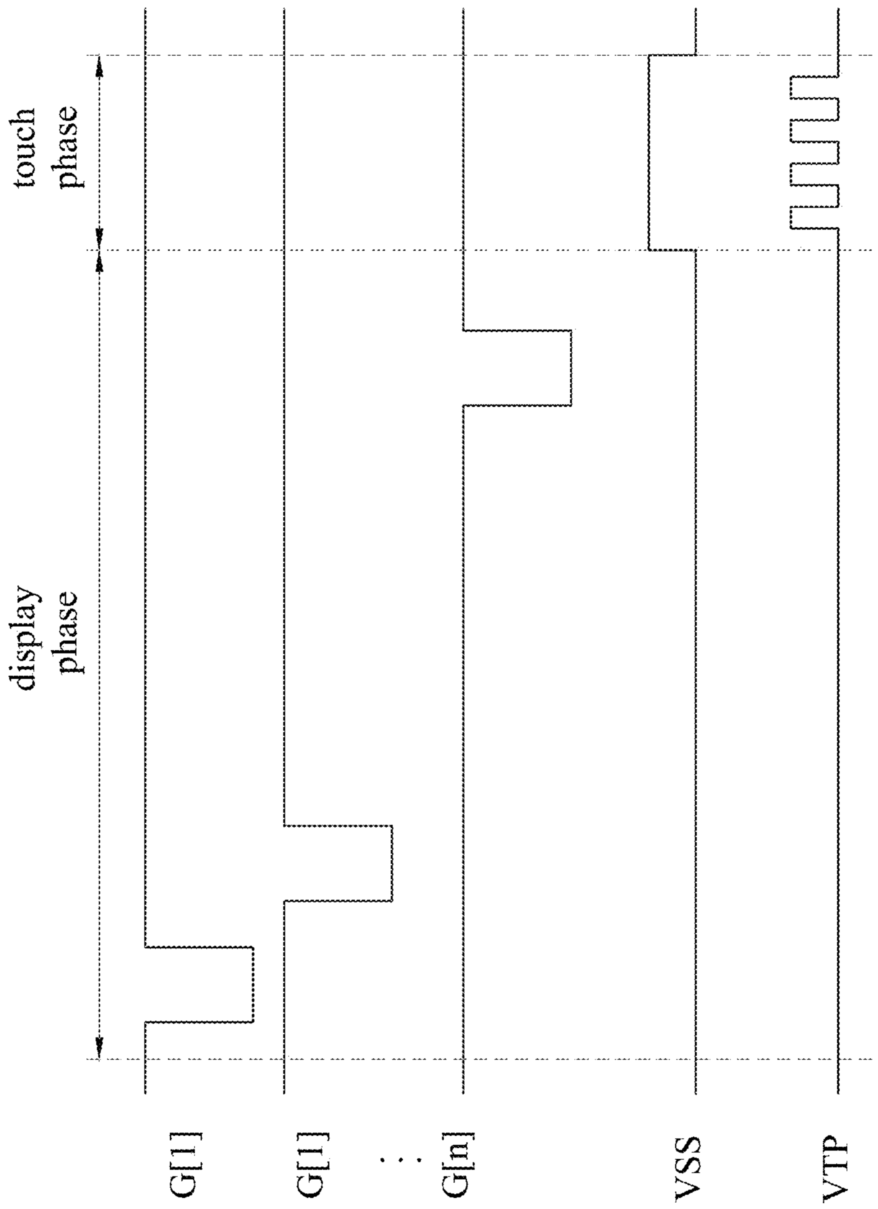
FIG. 6 is a waveform schematic diagram of a control signal of a pixel circuit according to an embodiment of the present disclosure.

Also Referring to FIG. 6, which is a waveform schematic diagram of the control signal of the touch display device 100 according to an embodiment of the present disclosure. The control signal waveform in FIG. 6 is applicable to the embodiment of FIG. 5. In the second embodiment, the first signal VSS is the at first voltage level during the display phase and at a second voltage level during the touch phase, where the second voltage level is higher than the first voltage level to disable the light emitting element 21. For example, the second voltage level may be a voltage level sufficient to cause the light emitting element 21 to enter a reverse bias state to ensure that the light emitting element 21 remains disabled during the touch phase. In this way, even if the first signal VSS may vary due to the coupling interference of the touch control signal VTP, the light emitting element 21 may remain the reverse bias during the touch phase and not emit or flicker erroneously during the touch phase.

Figure 7:
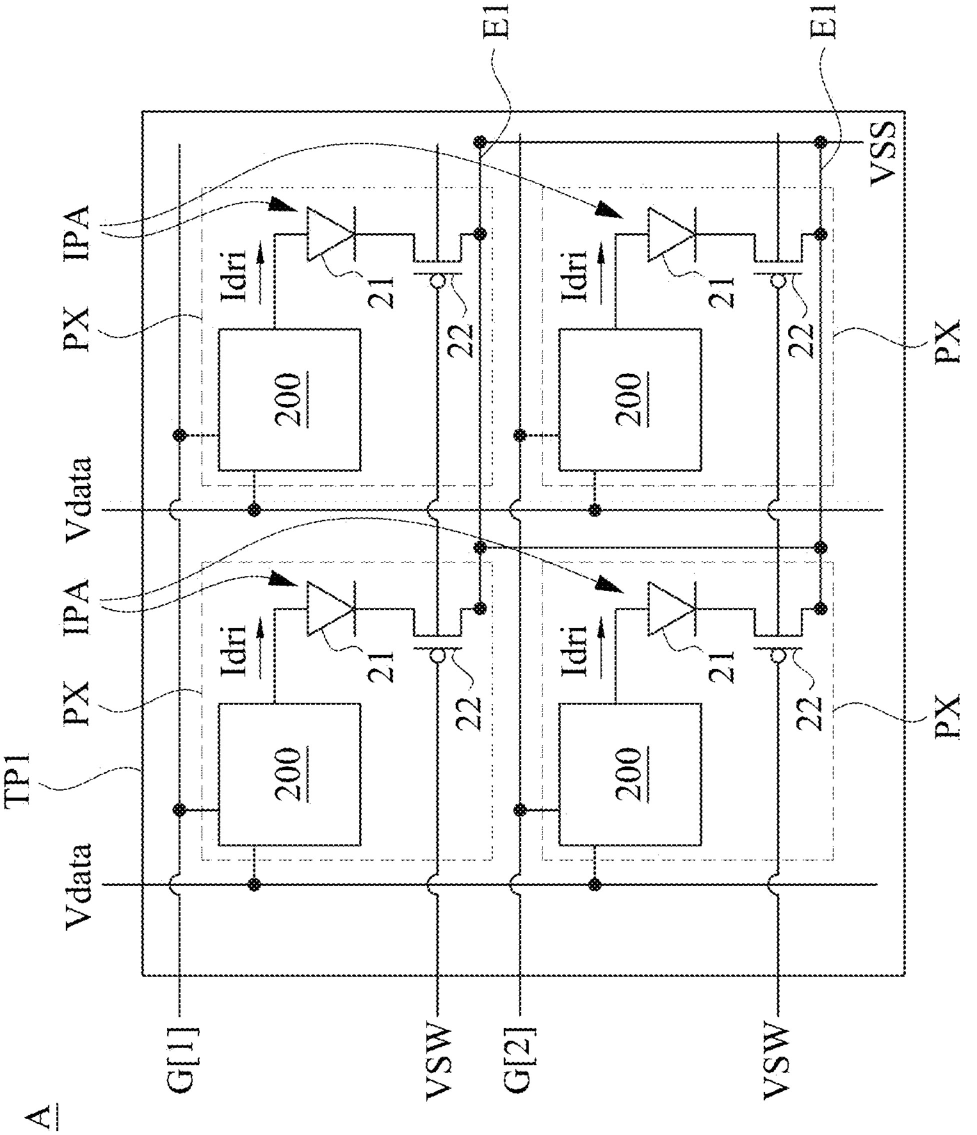
FIG. 7 is a schematic diagram of a pixel and touch electrode circuit according to an embodiment of the present disclosure.

Referring to FIG. 7, which is an enlarged schematic diagram of area A of the touch display device 100 according to an embodiment of the present disclosure. The difference between the embodiment of FIG. 7 and the embodiment of FIG. 2 is that, in the embodiment of FIG. 7, the first touch electrode TP1 is coupled to one or more of the electrodes E1 correspondingly, and the touch display device 100 does not need to generate the touch control signal VTP, but transmits the first signal VSS to the power electrode E1 and the first touch electrode TP1. The first touch electrode TP1 and the one or more power electrodes E1 coupled thereto may be implemented with different metal layers, or the first touch electrode TP1 and the one or more power electrodes E1 coupled thereto may be substantially the same electrode. The rest of the embodiment of FIG. 7 is similar to the embodiment of FIG. 2 and will not be repeated here.

Figure 8:
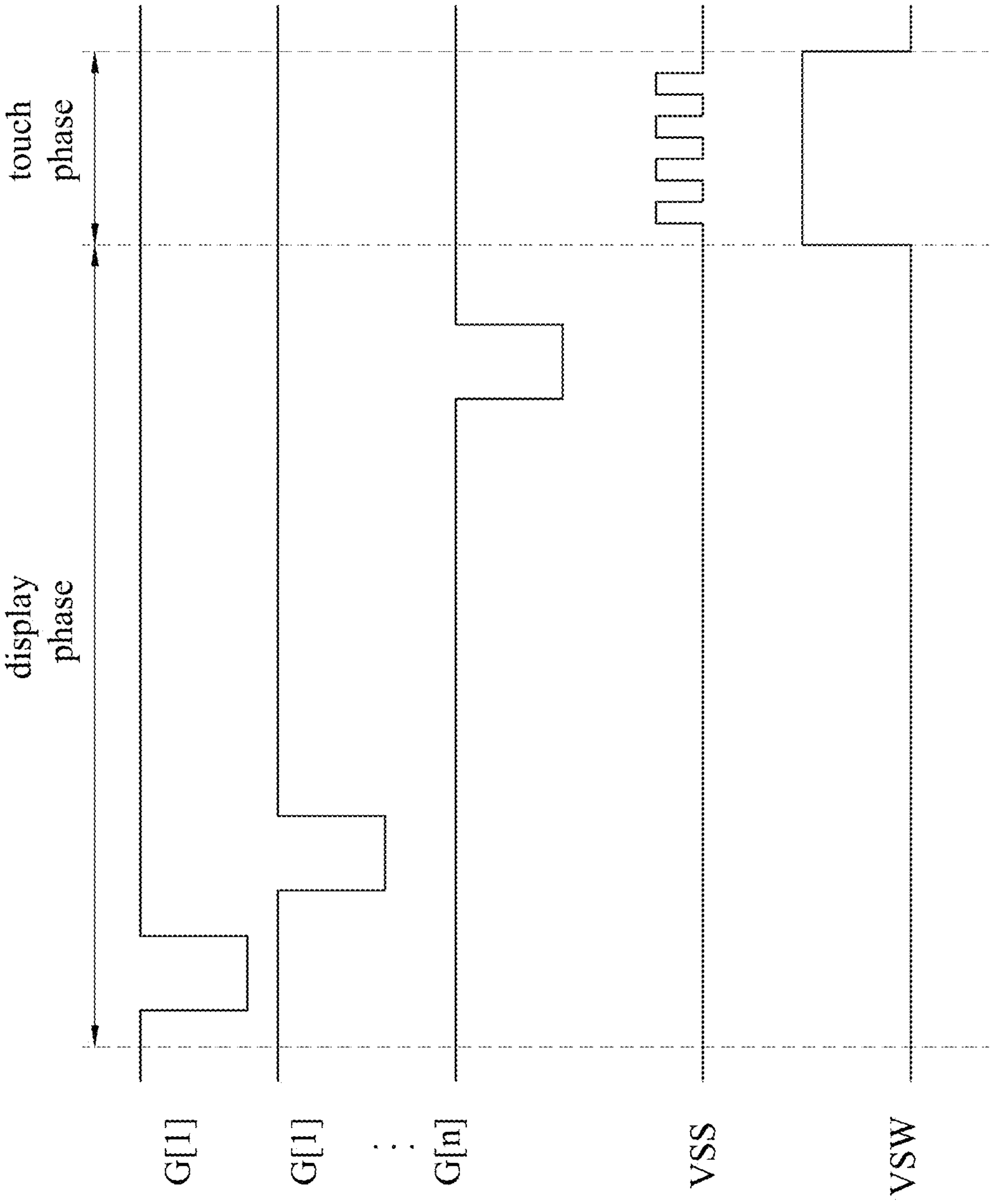
FIG. 8 is a waveform schematic diagram of a control signal of a pixel circuit according to an embodiment of the present disclosure.

Also Referring to FIG. 8, which is a waveform schematic diagram of a control signal of the touch display device 100 according to an embodiment of the present disclosure. The control signal waveform in FIG. 8 is applicable to the embodiment of FIG. 7. In the embodiment of FIG. 7, the first signal VSS is the at first voltage level during the display phase, and being alternately switched between the first voltage level and the second voltage level during the touch phase, where the second voltage level is higher than the first voltage level. In other words, the first signal VSS is a periodic signal with a periodic waveform during the touch phase. That is, the first signal VSS during the touch phase is similar to the touch control signal VTP in the foregoing embodiments, so the touch display device 100 can detect touch events through the first signal VSS. On the other hand, the function of the switch control signal VSW is similar to the embodiment of FIG. 4 and will not be repeated here. In this way, in addition to avoid flickering erroneously of the light emitting element 21 during the touch phase, since the power electrode E1 and the first touch electrode TP1 both receive the first signal VSS, the number of voltage sources and the number of traces in the touch display device 100 can be reduced, so power consumption can be saved and manufacturing difficulty can be reduced.

Figure 9:
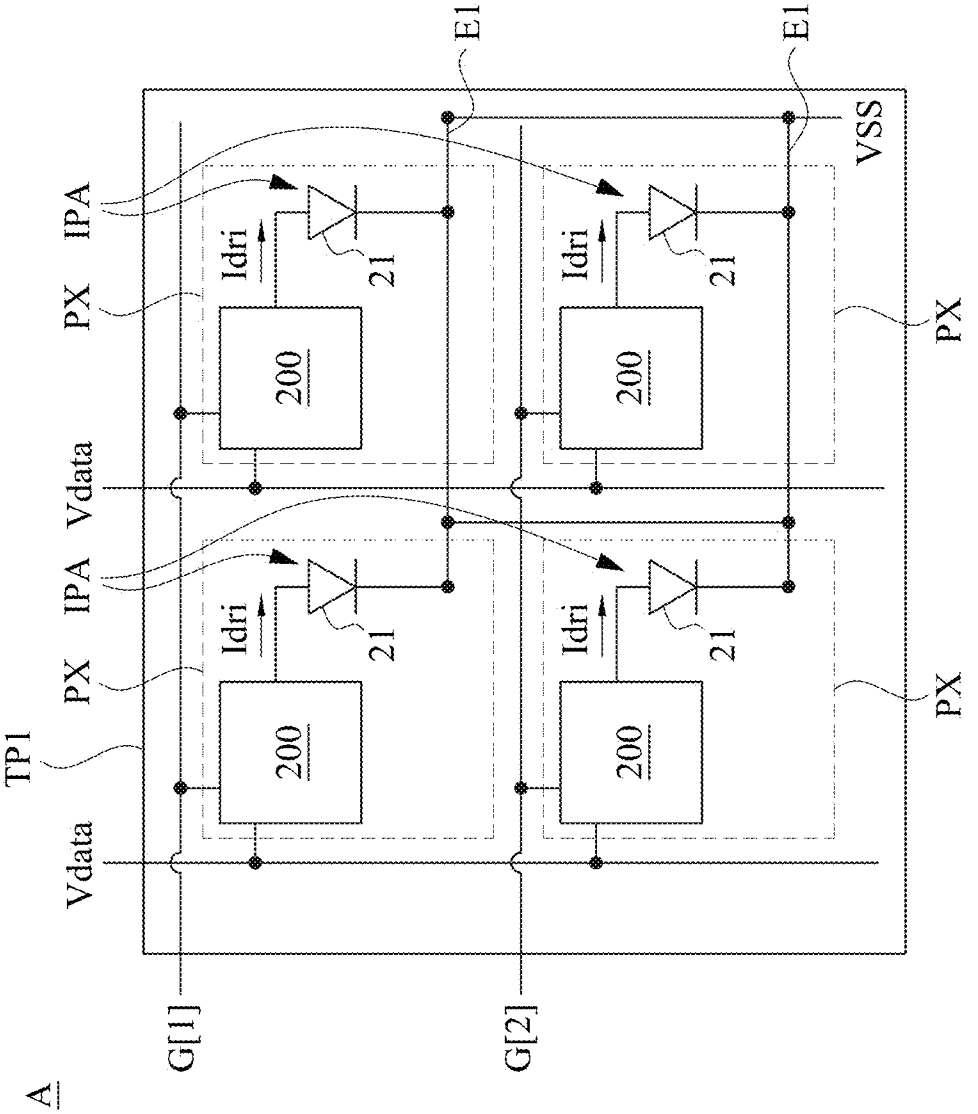
FIG. 9 is a schematic diagram of a pixel and touch electrode circuit according to an embodiment of the present disclosure.

Referring to FIG. 9, which is an enlarged schematic diagram of area A of the touch display device 100 according to an embodiment of the present disclosure. The difference between the embodiment of FIG. 9 and the embodiment of FIG. 2 is that, in the embodiment of FIG. 9, the touch display device 100 does not include the switch 22; the light emitting element 21 is directly coupled to the power electrode E1 to receive the first Signal VSS. Another difference between the embodiment of FIG. 9 and the embodiment of FIG. 2 is that, in the embodiment of FIG. 9, the first touch electrode TP1 is coupled to one or more of the power electrodes E1 correspondingly corresponding power electrodes E1, and the touch display device 100 does not need to generate the touch control signal VTP, but transmits the first signal VSS to the power electrode E1 and the first touch electrode TP1. The first touch electrode TP1 and the one or more power electrodes E1 coupled thereto may be implemented with different metal layers, or the first touch electrode TP1 and the one or more power electrodes E1 coupled thereto may be substantially the same electrode. The rest of the embodiment of FIG. 9 is similar to the embodiment of FIG. 2 and will not be repeated here.

Figure 10:
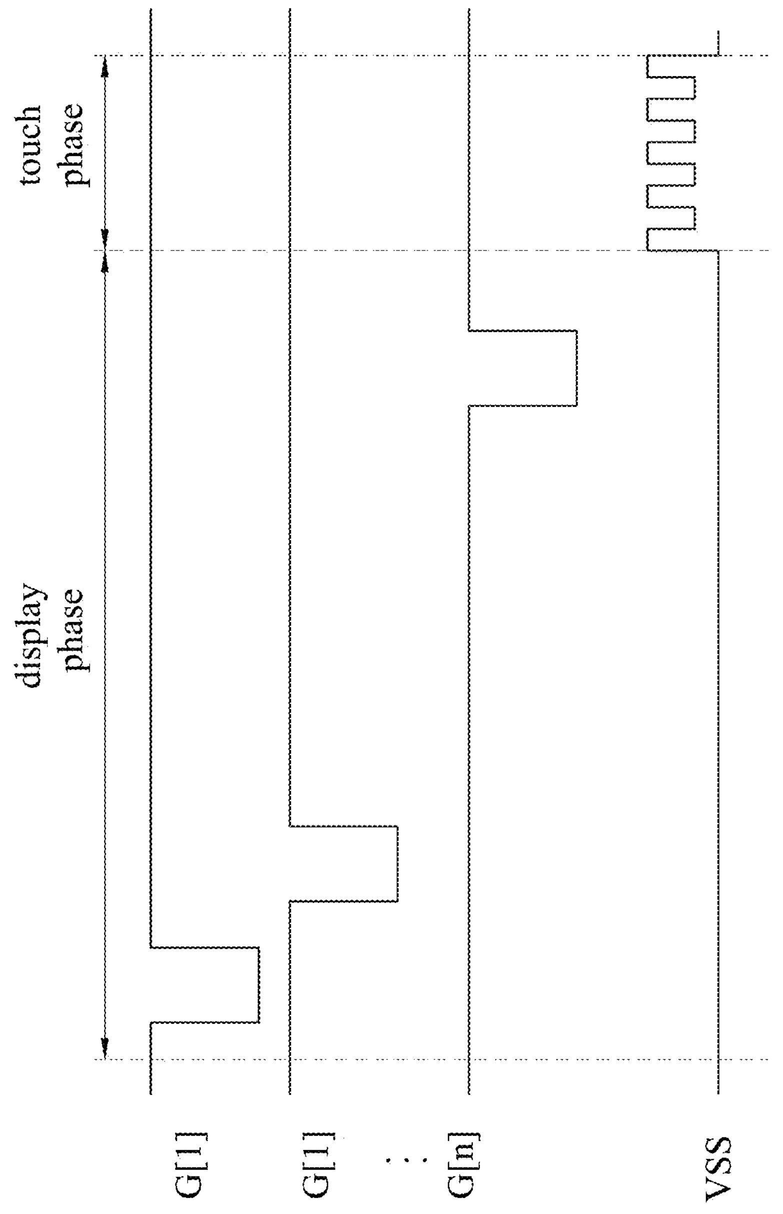
FIG. 10 is a waveform schematic diagram of a control signal of a pixel circuit according to an embodiment of the present disclosure.

Also referring to FIG. 10, which is a waveform schematic diagram of the control signal of the touch display device 100 according to an embodiment of the present disclosure. The control signal waveform in FIG. 10 is applicable to the embodiment of FIG. 9. In the embodiment of FIG. 10, the first signal VSS is at the first voltage level during the display phase, and being periodically alternately switched between a third voltage level and a fourth voltage level during the touch phase, wherein the third voltage level and the fourth voltage level are higher than the first voltage level to disable the light emitting element 21. In other words, the first signal VSS is a periodic signal with a periodic waveform during the touch phase, that is, the first signal VSS is similar to the touch control signal VTP in the embodiments mentioned above during the touch phase, so the touch display device 100 can detect touch events through the first signal VSS. It should be noted that both the third voltage level and the fourth voltage level can be voltage levels sufficient to cause the light emitting element 21 to enter the reverse bias state to ensure that the light emitting element 21 remains disabled during the touch phase, thereby preventing the light emitting element 21 from emitting or flickering erroneously during the touch phase. At the same time, since both the first electrode and the first touch electrode TP1 receive the first signal VSS, the number of power supplies and the number of traces in the touch display device 100 can be reduced, so power consumption can be saved and manufacturing difficulty can be reduced.

Figure 11:
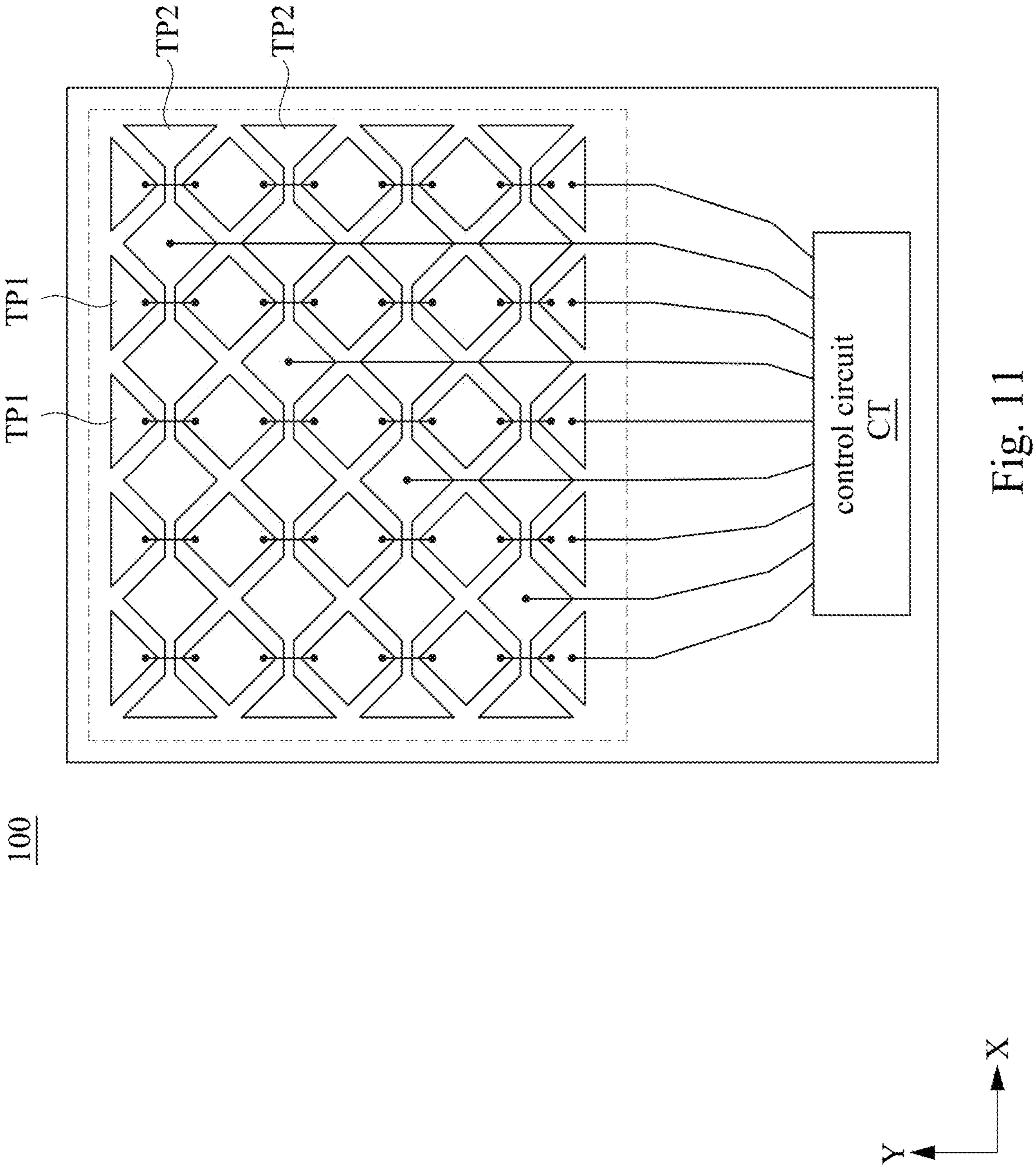
FIG. 11 is a schematic diagram of a touch display device according to an embodiment of the present disclosure.

Referring to FIG. 11, which is a simplified functional block diagram of a touch display device 1100 according to an embodiment of the present disclosure. The difference between the touch display device 1100 in FIG. 11 and the touch display device 100 in FIG. 1 is that, the touch display device 1100 in FIG. 11 is a mutual-capacitance touch display device, and the touch display device 1110 in FIG. 11 further includes a plurality of second touch electrodes TP2. The plurality of first touch electrodes TP1 are parallel to a Y-axis and include a plurality of first electrode blocks connected in series. The plurality of second electrodes TP2 are parallel to an X-axis and include a plurality of second electrode blocks connected in series, and the X-axis is orthogonal to the Y-axis. The connection relationship and operation of the pixel circuit PX, the power electrode E1 and the first touch electrode TP1 of the touch display device 1100 may be similar to the embodiments in FIGS. 2 to 4, FIGS. 5 to 6, or FIGS. 7 to 8. For the sake of brevity, they will not be repeated here.

Figure 12:
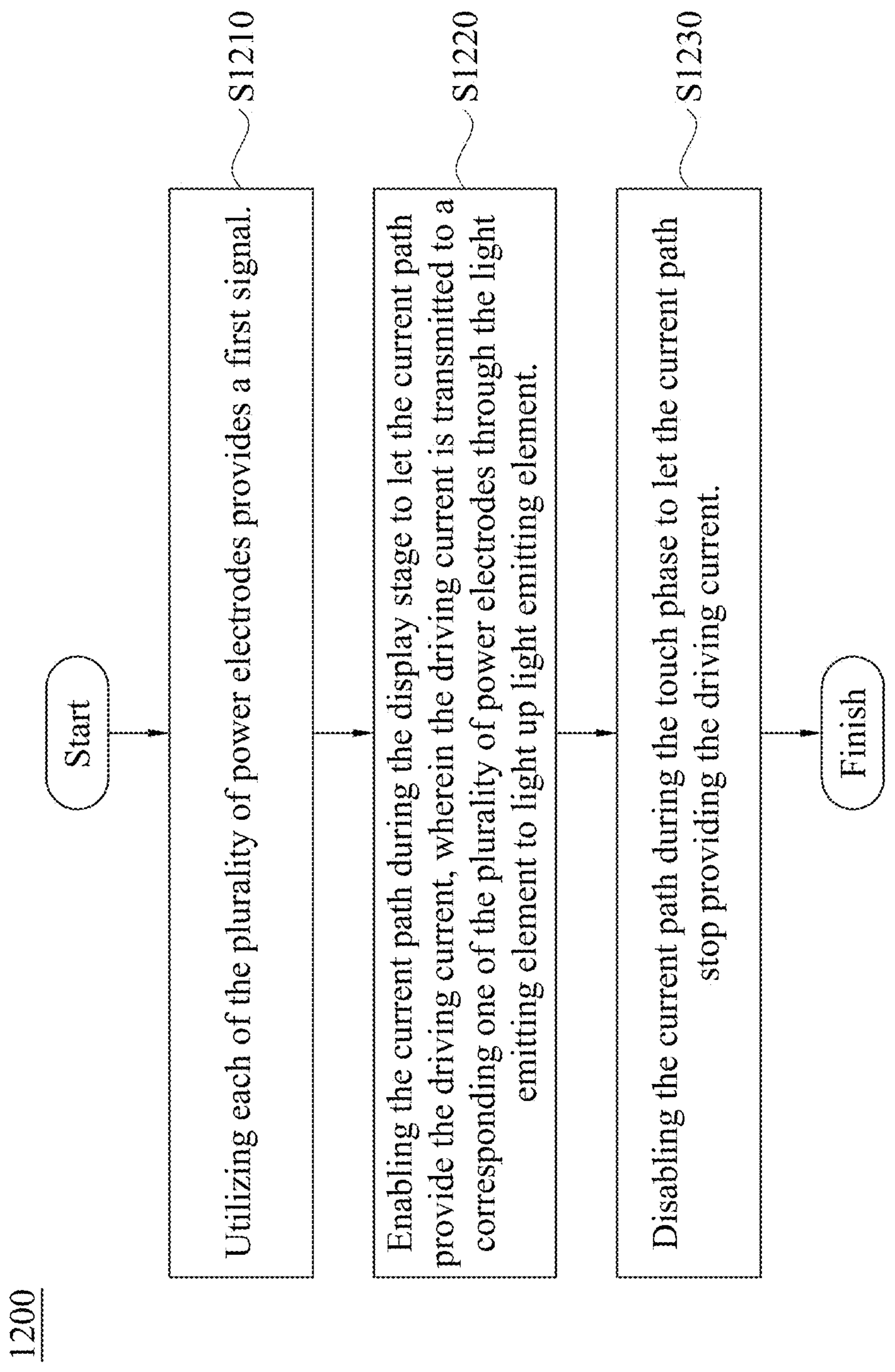
FIG. 12 is a flow chart of an operating method according to an embodiment of the present disclosure.

Referring to FIG. 12, which is a flow chart of an operating method 1200 according to an embodiment of the present disclosure. The operation method 1200 is applicable to a touch display device, such as the touch display device 100 in FIG. 1.

In step S1210, each of the plurality of power electrodes E1 provides a first signal VSS. In step S1220, the current path IPA is enabled during the display stage to let the current path IPA provide the driving current Idri, wherein the driving current Idri is transmitted to a corresponding one of the plurality of power electrodes E1 through the light emitting element 21 to light up light emitting element 21. In step S1230, the current path IPA is disabled during the touch phase to let the current path IPA stop providing the driving current Idri, so the light emitting element 21 will not be lit up.

In some embodiments (such as the embodiments in FIG. 2 and FIG. 4 mentioned above), the power electrode E1 and the first touch electrode TP1 are electrically insulated from each other, and each pixel circuit PX includes a switch 22. In this case, before or after step S1210, the operation method 1200 further includes the step: utilizing each of the plurality of first touch electrodes TP1 to provide a touch control signal (VTP), wherein the plurality of power electrodes E1 and the plurality of first touch electrodes TP1 are disposed on the same substrate. In addition, step S1220 includes: conducting the switch 22 during the display phase to enable the current path IPA. In addition, step S1230 includes: turning off the switch 22 during the touch phase to disable the current path IPA.

In some embodiments (such as the aforementioned embodiments in FIG. 5 and FIG. 6), the pixel circuit PX does not include the switch 22, and the touch electrode TP is coupled to one or more of the electrodes E1 correspondingly. In this case, before or after step S1210, the operation method 1200 further includes the step: utilizing each of the plurality of first touch electrodes TP1 to provide the touch control signal VTP, wherein the plurality of power electrodes E1 and the plurality of first touch electrodes TP1 are set on the same substrate. The first signal VSS is at the first voltage level during the display phase and at the second voltage level during the touch phase, and the second voltage level is higher than the first voltage level to disable the light emitting element 21. In addition, step S1220 includes: setting the first signal VSS at the first voltage level during the display stage. In addition, step S1230 includes: setting the first signal VSS at the second voltage level during the touch phase.

In some embodiments (such as the embodiments of FIG. 7 and FIG. 8), each pixel circuit PX includes a switch 22, and the touch electrode TP is coupled to the one or more of the electrodes E1 correspondingly. In this case, the role of the first signal VSS in the touch phase is equivalent to the touch control signal VTP, therefore, the touch display device 100 does not need to generate the touch control signal VTP, but transmits the first signal VSS to the power electrode E1 and touch electrode TP. Step S1220 includes: conducting the switch 22 during the display phase to enable the current path; and remaining the first signal VSS unchanged during the display phase. Step S1230 includes: turning off the switch 22 during the touch phase to disable the current path; and setting the first signal VSS to alternately switch between the first voltage level and the second voltage level during the touch phase, that is, having periodic waveform to detect touch events.

In some embodiments (such as the embodiments of FIG. 9 and FIG. 10), the pixel circuit PX does not include the switch 22, and the touch electrode TP is coupled to one or more of the electrodes E1 correspondingly. In this case, step S1220 includes: setting the first signal VSS at the first voltage level during the display phase. Step S1230 includes: setting the first signal VSS to alternately switch between a third voltage level and a fourth voltage level to detect touch events during the touch phase, wherein the third voltage level and the fourth voltage level are higher than the first voltage level to disable the light emitting element 21.

Any combination of features of the operating method 1200 may be implemented by multiple instructions stored in a non-transitory computer readable medium. When these instructions are executed by one or more processors, these instructions may cause part or all of operating method 1200 to be performed. It should be understood that operating method 1200 may include more or fewer steps than shown in the flow chart, and the steps of operating method 1200 may be performed in any suitable order.

In summary, according to various embodiments of the present disclosure, the problem that the light emitting elements in the touch display device may flicker due to signal interference during the touch phase can be avoided; at the same time, the first electrode and the touch electrode share the same electrode, so that the number of power supplies can be reduced to achieve the technical advantage of saving power consumption.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A touch display device, comprising:

a plurality of power electrodes, each configured to provide a first signal; and a plurality of pixel circuits, wherein each of the plurality of pixel circuits comprises:

a current path, coupled between a driving circuit and a corresponding one of the plurality of power electrodes;

a light emitting element, set on the current path; and a switch, the switch is only coupled between the light emitting element and a corresponding one of the plurality of power electrodes on the current path; and a plurality of first touch electrodes electrically insulated from the light emitting element of each pixel circuit;

wherein the switch is configured to be conducted to enable the current path during a display phase to let the current path provide a driving current from the driving circuit, the driving current is transmitted to the corresponding one of the plurality of power electrodes through the light emitting element to light up the light emitting element, wherein the switch is configured to be turned off to disable the current path during a touch phase to let the current path stop providing the driving current from the driving circuit.

2. The touch display device of claim 1, wherein each of the plurality of first touch electrodes is configured to provide a touch control signal, wherein the plurality of power electrodes and the plurality of first touch electrodes are disposed on a same substrate.

3. The touch display device of to claim 2, further comprising a plurality of second touch electrodes, wherein the plurality of first touch electrodes are parallel to a Y-axis and comprise a plurality of first electrode blocks connected in series, the plurality of second touch electrodes are parallel to an X-axis and comprise a plurality of second electrode blocks connected in series, and the X-axis is orthogonal to the Y-axis.

4. The touch display device of to claim 2, wherein the plurality of first touch electrodes are rectangular and arranged in an array.

5. The touch display device of claim 1, wherein each the plurality of first touch electrodes is configured to provide a touch control signal, wherein the plurality of power electrodes and the plurality of first touch electrodes are disposed on a same substrate;

wherein the first signal is at a first voltage level during the display phase, the first signal is at a second voltage level during the touch phase, and the second voltage level is higher than the first voltage level to disable the light emitting element.

6. The touch display device of claim 1, wherein the plurality of first touch electrodes are configured to receive the first signal, wherein the plurality of power electrodes and the plurality of first touch electrodes are disposed on a same substrate, and each of the first touch electrodes is coupled to one or more of the plurality of power electrodes correspondingly, wherein the first signal is remained unchanged during the display phase, and the first signal has a periodic waveform during the touch phase to detect a touch event.

7. The touch display device of claim 1, wherein the plurality of first touch electrodes are configured to receive the first signal, wherein the plurality of power electrodes and the plurality of first touch electrodes are disposed on a same substrate, and each of the first touch electrodes is coupled to one or more of the plurality of power electrodes correspondingly, wherein the first signal is at a first voltage level during the display phase, and the first signal is alternately switched between a third voltage level and a fourth voltage level during the touch phase to detect a touch event, wherein the third voltage level and the fourth voltage level are higher than the first voltage level to disable the light emitting element.

8. An operating method, for a touch display device, wherein the touch display device comprises a plurality of power electrodes, a plurality of pixel circuits and a plurality of first touch electrodes, wherein each of the pixel circuits comprises a current path, a light emitting element and a switch, wherein the current path is coupled between a driving circuit and a corresponding one of the plurality of power electrodes, the light emitting element is set on the current path, the switch is only coupled between the light emitting element and a corresponding one of the plurality of power electrodes on the current path, and the plurality of first touch electrodes electrically insulated from the light emitting element of each pixel circuit, wherein the operating method comprises:

providing a first signal by each of the plurality of power electrodes;

conducting the switch to enable the current path during a display phase to let the current path provide a driving current from the driving circuit, wherein the driving current is transmitted to the corresponding one of the plurality of power electrodes through the light emitting element to light up the light emitting element; and turning off the switch to disable the current path during a touch phase to let the current path stop providing the driving current from the driving circuit.

9. The operating method of claim 8, wherein the operating method further comprises:

utilizing each of the plurality of first touch electrodes to provide a touch control signal, wherein the plurality of power electrodes and the plurality of first touch electrodes are disposed on the same substrate.

10. The operating method of claim 8, further comprising:

utilizing each of the plurality of touch electrodes to provide a touch control signal, wherein the plurality of power electrodes and the plurality of touch electrodes are disposed on the same substrate.

11. The operating method of claim 10, wherein enabling the current path during the display phase comprises: setting the first signal to be at a first voltage level during the display phase.

12. The operating method of claim 11, wherein disabling the current path during the touch phase comprises: setting the first signal to be at a second voltage level during the touch phase, wherein the second voltage level is higher than the first voltage level to disable the light emitting element.

13. The operating method of claim 8, wherein enabling the current path during the display phase comprises:

remaining the first signal unchanged during the display phase, wherein disabling the current path during the touch phase comprises:

setting the first signal to have a periodic waveform during the touch phase to detect a touch event.

14. The operating method of claim 8, wherein enabling the current path during the display phase comprises: setting the first signal to be at a first voltage level during the display phase, wherein disabling the current path during the touch phase comprises:

setting the first signal to be alternately switch between a third voltage level and a fourth voltage level during the touch phase to detect a touch event, wherein the third voltage level and the fourth voltage level are higher than the first voltage level to disable the light emitting element.

* * * * *